United States Patent
Kasperson et al.

(10) Patent No.: US 11,212,209 B2
(45) Date of Patent: Dec. 28, 2021

(54) SPEED DETERMINATION FOR NETWORK PORTS

(71) Applicant: HEWLETT PACKARD ENTERPRISE DEVELOPMENT LP, Houston, TX (US)

(72) Inventors: David Kasperson, Round Rock, TX (US); Robert Teisberg, Georgetown, TX (US); Charles S. Greenidge, Loveland, CO (US); Alexander Kramer, Frisco, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 76 days.

(21) Appl. No.: 16/513,151

(22) Filed: Jul. 16, 2019

(65) Prior Publication Data
US 2021/0021505 A1    Jan. 21, 2021

(51) Int. Cl.
*H04L 12/26* (2006.01)
*H04L 12/935* (2013.01)
*H04L 12/24* (2006.01)

(52) U.S. Cl.
CPC .......... *H04L 43/50* (2013.01); *H04L 41/0896* (2013.01); *H04L 43/0894* (2013.01); *H04L 49/30* (2013.01)

(58) Field of Classification Search
CPC . H04L 43/50; H04L 43/0894; H04L 43/0811; H04L 41/0896; H04L 41/0806; H04L 41/12; H04L 49/30
See application file for complete search history.

(56) References Cited

U.S. PATENT DOCUMENTS

| 7,254,652 | B2 | 8/2007 | Anderson et al. |
| 8,621,128 | B2 | 12/2013 | Radulescu et al. |
| 8,977,781 | B1* | 3/2015 | Yokoi .................. G06F 3/0613 710/5 |
| 9,531,596 | B2 | 12/2016 | Volpe et al. |
| 9,641,350 | B2* | 5/2017 | Johnsen ............. H04L 12/6402 |
| 9,875,201 | B2 | 1/2018 | Adhikesavalu et al. |
| 2004/0081104 | A1* | 4/2004 | Pan ...................... G06F 9/4405 370/254 |
| 2006/0277324 | A1 | 12/2006 | Aldereguia et al. |
| 2013/0016731 | A1* | 1/2013 | Johnsen ............. H04L 12/4641 370/401 |
| 2016/0065422 | A1* | 3/2016 | Khargharia ........... H04L 47/781 370/412 |

(Continued)

OTHER PUBLICATIONS

8-Port Gigabit SOHO Ethernet Switch, (Web Page), 2008, 2 Pgs.

*Primary Examiner* — Min Jung
(74) *Attorney, Agent, or Firm* — Nolte Lackenbach Siegel

(57) ABSTRACT

A network switching environment includes a network switch coupled to a port extension module by one or more network cables, and a management resource coupled to the switch and the port extension module. The configurations of the network switch and the port extension module may be dynamically controlled by a management resource to adjust to changes in the maximum bandwidth provided by the one or more network cables. The management resource may implement the network switch and port extension module configurations according to a predetermined target configuration and the connection configuration of the network switch and the port extension module.

20 Claims, 6 Drawing Sheets

(56) References Cited

U.S. PATENT DOCUMENTS

2016/0162429 A1*  6/2016  Krishnamurthy ... G06F 13/4022
                                                    710/300
2016/0275905 A1   9/2016  Sacchetto et al.
2018/0199292 A1*  7/2018  Mula ....................... G06F 1/325
2018/0302496 A1* 10/2018  Tarasenko ........... H04L 41/0843

* cited by examiner

SPEED DETERMINATION FOR NETWORK PORTS

BACKGROUND

The data transfer speeds available for the transfer of data between two network components are determined at least in part by the maximum bandwidth provided by the one or more network cables connecting the network components, and by the bandwidths for which the respective network ports of the network components are configured to operate. Cables connecting network components may provide encoded information about their maximum bandwidth capabilities.

BRIEF DESCRIPTION OF THE DRAWINGS

The examples of the present techniques are better understood by referring to the following detailed description and the attached drawings, in which.

DETAILED DESCRIPTION

Figure 1:
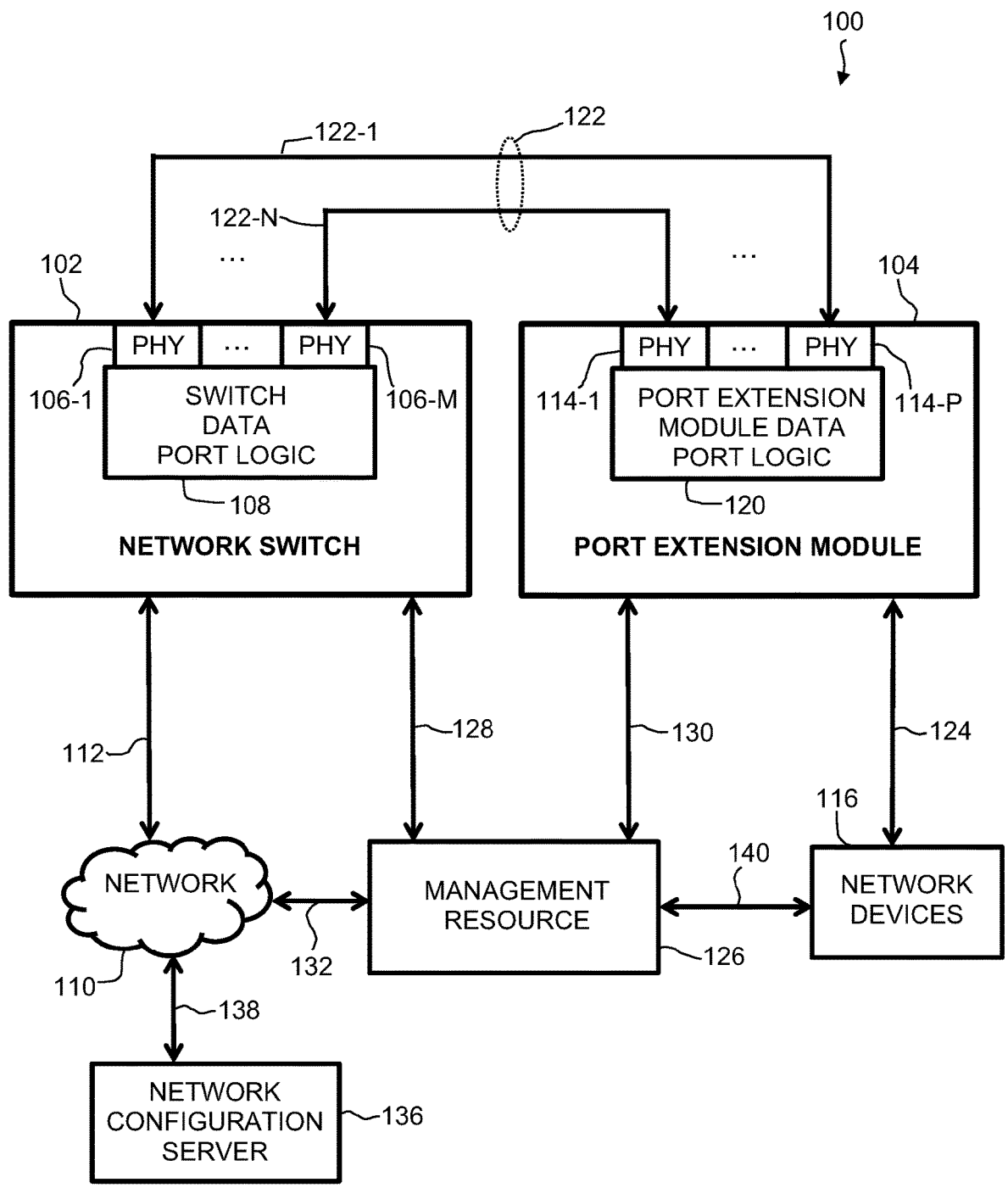
FIG. 1 is a block diagram of an example network system.

Computer network components, such as Ethernet switches, may have data ports for supporting data transfer operations with other network components across network connections. As used herein, the term "data port" refers to the logic circuitry implementing the physical layer ("PHYS") of the Open Source Interconnection (OSI) seven-layer network model. As such, a data port may be implemented with logic circuitry including one or more application-specific integrated circuits (ASICs) or other dedicated logic circuitry.

The maximum bandwidth, or data transfer speed, available between two connected data ports is primarily determined by two factors: the capabilities of the hardware implementing the connected data ports, and the bandwidth provided by incoming and outcoming data cables. A cable's bandwidth may provide one or more "data lanes," A data lane, or simply, a "lane," is a communications channel capable of supporting data transfer between two data ports at a certain bandwidth (or range of bandwidths up to a maximum bandwidth). In an electrical (as opposed to optical) cable, a data lane generally corresponds to a pair of conductors. Connections to a data port may be made with one or more network cables, each having a maximum bandwidth and providing a number of data lanes. A network cable connected between two data ports may be capable of providing sufficient bandwidth for one or more data lanes for data transfer between the ports. The bandwidth of a cable or of a data lane may be expressed more generally in terms of megabits per second (Mbps) or gigabits per second (Gbps), for example. In the case of a remote network component, one or more network cables connecting the remote network component to a local network component may be used to provide a plurality of data lanes between the two components. The data lanes of a cable may be distributed among one or more data ports of a network component, and data lanes from separate cables may be combined to provide bandwidth to a common port. An example of a remote network component is a port extension module, which may have one or more data ports each connected by one or more network cables to one or more data ports of a local network component, such as a network switch.

A network cable may be equipped with interfaces at each end for providing certain identifying information when interrogated by a connected device. Such identifying information may comprise, for example, a unique identifier which may include a vendor ID combined with a serial number. The unique identifier may be used to determine how many lanes are available between the two endpoints of a cable. Thus the total bandwidth between the endpoints can be calculated. Further, by providing the information at each end, the cables may thereby enable a management resource interrogating the cables to ascertain the network topology of the networking arrangement in which the cables are deployed. As used herein, the term "network topology" includes, without limitation, the number and capacity of lanes provided by the cables, as well as the physical layer ports to which lanes of each cable are assigned.

A mis-match may exist between the bandwidth provided by the one or more network cables connecting two network components and the configuration of the port(s) connected at either end by the one or more network cables. As used herein, the "configuration" of a network port refers to the hardware and software settings and parameters used to cause a network port to operate according to a given communication protocol and to exchange data at a given data transfer rate or within a given range of data transfer rates. "Configuring" a network port refers to ensuring that the appropriate hardware is activated in the port and that the appropriate settings and parameters are provided to cause the hardware to operate according to the given protocol at the desired data transfer rate. A configuration mis-match may exist, for example, when a port extension module may not be configured to utilize all of the lanes or bandwidth provided by the network cables connecting it to a network switch. Such a mis-match may result in overall wasted throughput capabilities of a network.

In examples described herein, network components may be automatically configured to utilize all available bandwidth of the lanes provided by connecting network cables, or to utilize a desired target bandwidth less than the total amount of the lanes provided by connecting cables.

In this description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

The terms "computing system" and "computing resource" are generally intended to refer to at least one electronic computing device that includes, but is not limited to including, a single computer, virtual machine, virtual container, host, server, laptop, and/or mobile device, or to a plurality of electronic computing devices working together to perform the function(s) described as being performed on or by the computing system. The term also may be used to refer to a number of such electronic computing devices in electronic communication with one another.

The term "non-transitory storage medium" refers to one or more non-transitory physical storage media that together store the contents described as being stored thereon. Examples may include non-volatile secondary storage, read-only memory (ROM), and/or random-access memory (RAM). Such media may be optical or magnetic.

The terms "application" and "function" refer to one or more computing modules, programs, processes, workloads, threads and/or a set of computing instructions executed by a computing system. Example implementations of applications and functions include software modules, software objects, software instances and/or other types of executable code. Note, the use of the term "application instance" when used in the context of cloud computing refers to an instance within the cloud infrastructure for executing applications (e.g., for a customer in that customer's isolated instance).

Turning now the drawings, FIG. 1 is a block diagram of an example network system 100 including a plurality of network components. including a network switch 102 and a port extension module 104. Network switch 102 includes one or more physical interface (PHY-layer) data ports 106-1 . . . 106-M, where M≥1. Network switch 102 may further include switch data port logic 108 for controlling its operation. Switch data port logic 108 may be implemented in various forms, such as with application-specific integrated circuits (ASICs), microprocessors, microcontrollers, or combinations thereof.

Network switch 102 may be connected to a computer network 110, or another network component, via a network connection 112. In operation, network switch 102 may function to route network data transfers between computer network 110 and another network component, such as port extension module 104 in the example of FIG. 1, through data port2 106-1 . . . 106-M.

Port extension module 104 may include one or more PHY-layer data ports 114-1 . . . 114-P, where P≥1. Port extension module 104 may further include logic 120 for controlling its operation. Port extension module logic 120 may be implemented in various forms, such as with application-specific integrated circuits (ASICs), microprocessors, microcontrollers, or combinations thereof. Port extension module 104 may be communicatively coupled to one or more additional network devices 116 via one or more network connections 124.

As shown in FIG. 1, network switch 102 is connected to port extension module 104 by one or more network cables 122, including for example, network cables 122-1 . . . 122-N, where N≥1. In the example of FIG. 1, cables 122 may be of various lengths and of various basic types, such as copper, optical fiber, etc., and may have various bandwidth capacities, which may be expressed in terms of the number of data lanes supported by each cable 122. Further, network cables 122 may incorporate cable identifier interfaces providing information about physical characteristics, bandwidth capacities and/or other capabilities. Moreover, as noted above, the identifier interfaces enable other connected devices to determine the topology of the network in which the cables are deployed. Such cable identifier interfaces may include embedded tags or other logic encoding identifying information accessible to connected circuitry at each end of cables 122, such as, for example, switch port data logic 108 in network switch 102 and port extension module data port logic 120 in port extension module 104. The cable identifier information may be accessible via interfaces at either end of the cable.

With continued reference to FIG. 1, network system 100 further includes a management resource 126, coupled to network switch 102 by a connection 128 and coupled to port extension module 104 by a connection 130. In one example, management resource comprises a general purpose computer platform or other microprocessor or microcontroller-based network device implementing network managing processes. In this example, connections 128 and 130 provide a mechanism by which management resource 126 can communicate with switch data port logic 108 and port extension module data port logic 120. In some examples, connections 128 and 130 may be bi-directional serial data connections, such as connections based on the Controller Area Network (CAN) bus standard.

In one example, management resource 126 may be implemented on a general purpose computing platform executing network management software. Management resource 126 may be connected to network 110 via a connection 132, such that management resource 126 may thereby communicate with other devices or systems connected to computer network 110. For example, as shown in FIG. 1, management resource 126 may communicate via connection 132 and computer network 110 with a network configuration server 136 connected to computer network 110 by a network connection 138. Further, management resource 126 may be connected to one or more network devices 116 via a connection 140, such that management resource 126 may communicate with or otherwise obtain information about network devices 116.

By communicating with network switch 102 and port extension module 104 via respective connections 128 and 130, management resource 126 may be capable of determining the network topology of network system 100, including the assignment of data lanes provided by network cables 122 to data ports 106-1 . . . 106-M and 114-1 . . . 114-P. As hereinafter described, management resource 126 may be capable of dynamically monitoring and controlling the network topology of data ports 106-1 . . . 106-M and 114-1 . . . 114-P based on additional information, such as network topology and configuration settings specified by network configuration server 134, for example.

Figure 2:
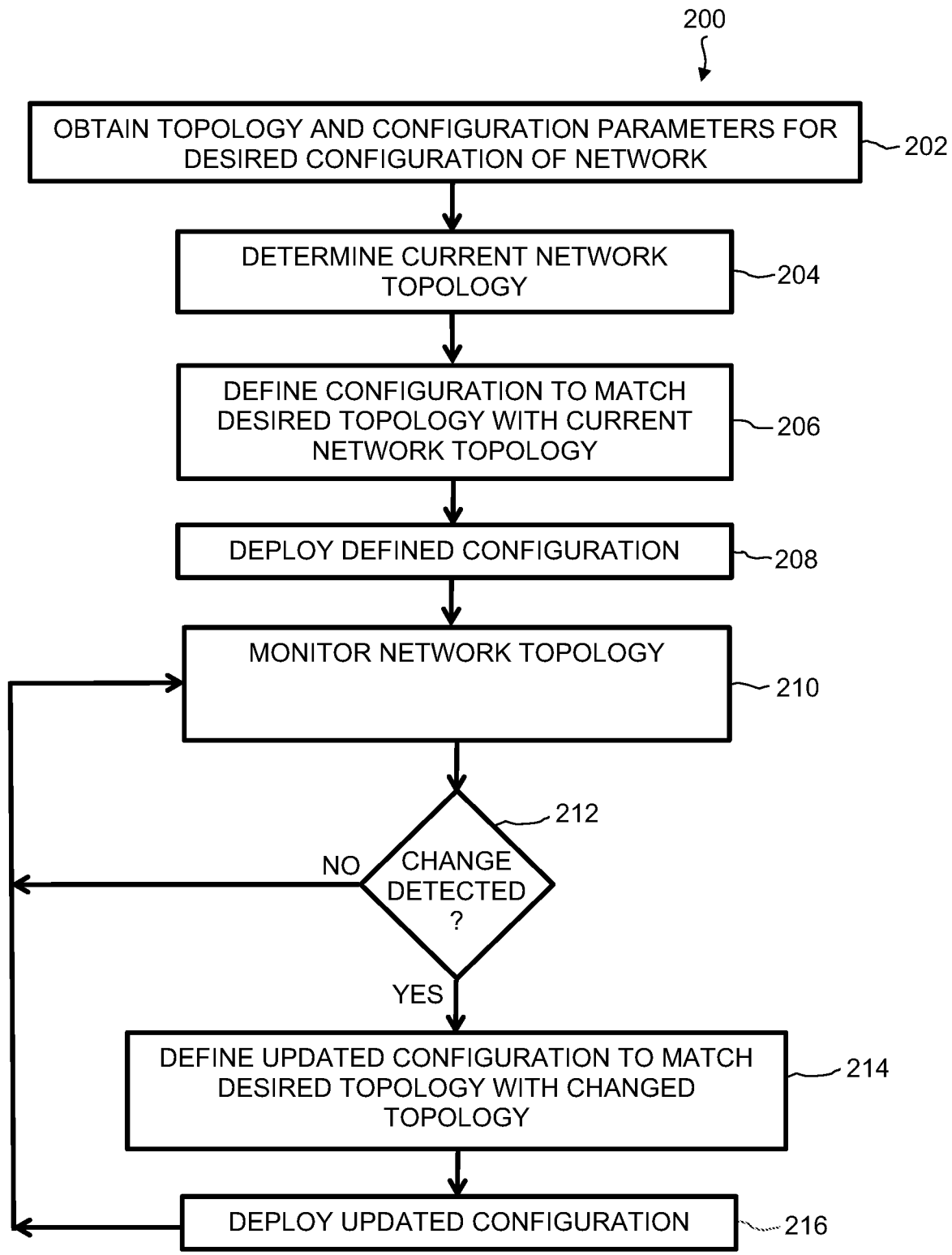
FIG. 2 is a block diagram of an example method for configuring a network connection.

In one example, operation of network management resource 126 may be described according to the method 200 shown in FIG. 2. Method 200 begins at block 202 in which a management resource, such as management resource 126 in the example of FIG. 1, obtains topology and configuration parameters for a desired configuration of a network system, such as network system 100 in the example of FIG. 1. Such parameters may include, for example, target bandwidths desired to be realized for data transfer between network components.

In block 204, a management resource may determine the topology of the network system. This determination in block 204 may be accomplished by a network resource interrogating the network components to identify the connecting cables between the network components. A management resource may interrogate connected network components by issuing identification queries according to any of various established protocols, such as the Link Layer Discovery Protocol (LLDP). This determination may further be accomplished by interrogating each identified cable to determine the number of data lanes provided by each identified cable, to compute a determined total number of data lanes currently provided by the connecting cables, and to determine the assignment of lanes from each cable to each port in the network system.

In block 206, a management resource may define a network configuration with the objective of matching the desired network topology with the topology determined in block 204. In one example case, a desired network topology may specify a target bandwidth between two network components that exceeds the maximum total bandwidth provided by the identified cables. In such a case, the management resource may define a network configuration to utilize all of the bandwidth provided by the identified cables, even though the target bandwidth is greater. The management resource may further prevent communication if a target bandwidth in a desired topology exceeds a supported limit of the identified cables. In another example case, a desired network topology may specify a target bandwidth between two network components that is less than maximum total bandwidth provided by the identified cables. In this case, the management resource may define a topology to utilize less than all of the bandwidth provided by the connecting cables between the two network components. In still another example case, the desired topology may specify that the management resource is to use all data lanes provided by the cables connecting the two network components, i.e., without specifying a particular target bandwidth.

In some examples, a management resource may define a network system configuration based not only on the maximum total bandwidth provided by connecting cables between two network components, but also upon system constraints such as inherent limitations of one or both of the network components. For one example, one connected network component may have data port hardware which limits the total data transfer capabilities of the component. Information regarding hardware specifications of the network components may be obtained via direct connections between the management resource and the components (such as connections 128 and 130 in the example of FIG. 1). Such information may also be obtained by a management resource through communication with a network configuration server, such as network configuration server 134 in the example of FIG. 1.

For another example, in defining a network configuration in block 206, a management resource may obtain information, from the connected network components, or from a network configuration server, which relates the definition of a network configuration in block 206 with the definition of another, related network configuration, such as the configuration of a connected pair of network components implemented to operate cooperatively (e.g., redundantly or as a virtualized combination) with the pair involved in block 206.

Once a network configuration has been defined in block 206, in block 208 the defined configuration is deployed. The deployment of the configuration may involve, for example, a management resource issuing control signals to the connected network devices causing the network devices to adjust their operation according to the defined configuration.

Once a network configuration has been deployed in block 208, block 210 represents the ongoing or periodic monitoring of the network topology, including the connections between the configured network components. Such monitoring may involve, for example, continuous or periodic interrogation of the network components to detect any changes to the topology, such as if a network cable unexpectedly fails or is disconnected, or if a network cable is added to the connection configuration.

As represented by decision block 212 in FIG. 2, so long as no change in the topology is detected, the management resource will return to block 210 to monitor the topology on a continuous or recurring basis.

On the other hand, at block 212 if a topology change is detected, such as for example by the disconnection or failure of a connecting cable, operation proceeds to block 214, wherein an updated configuration is defined, again with the objective (as in block 206) of matching the changed topology to the desired topology. Once an updated configuration is defined in block 214, it may be deployed in block 216. Thereafter, monitoring of the connection configuration in block 210 may resume.

Figure 3:
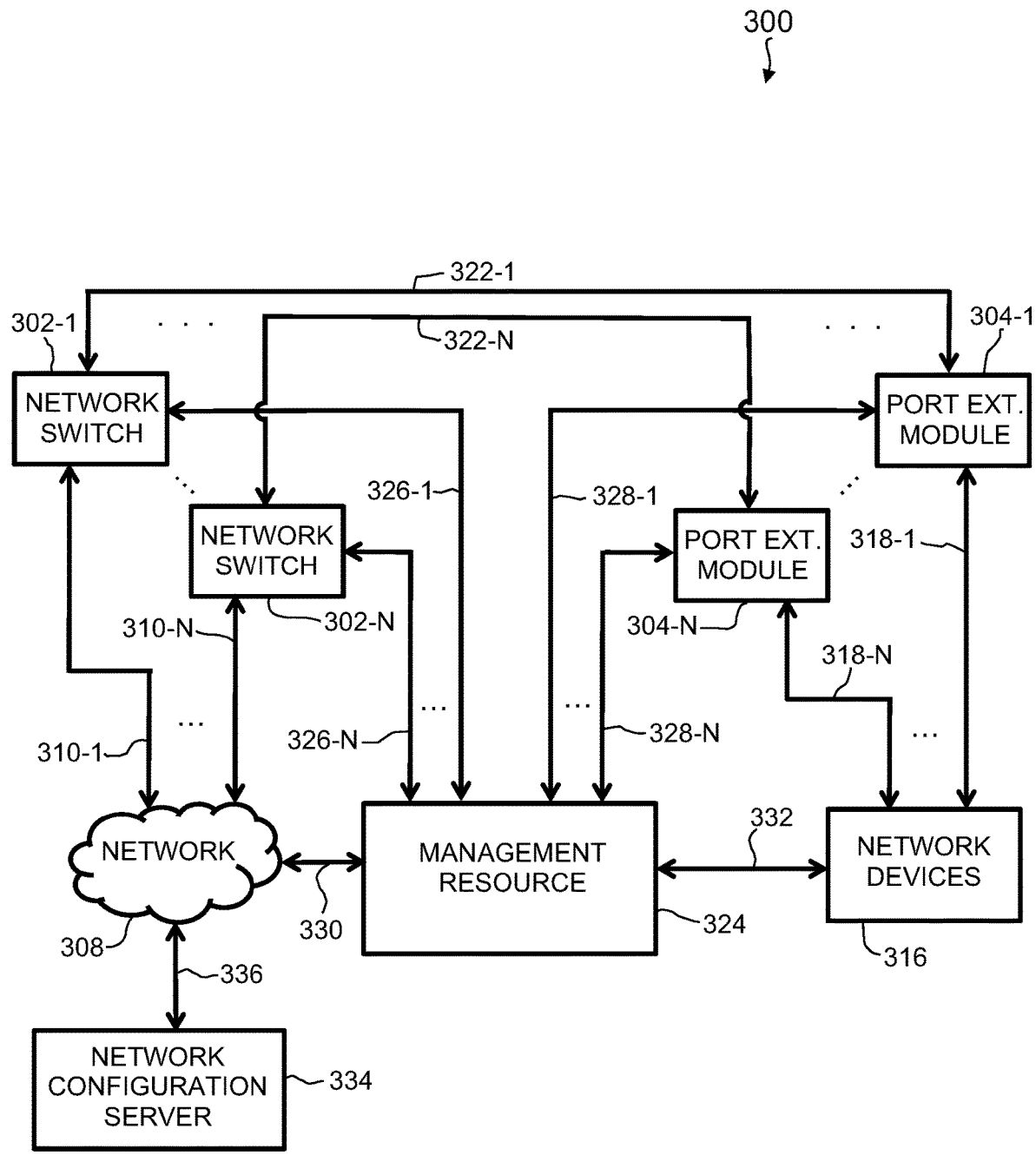
FIG. 3 is a block diagram of another example network system.

FIG. 3 is a block diagram of another example network system 300. Network system 300 includes N network switches 302-1 . . . 302-N (where N≥1). In this example, network switches 302-1 . . . 302-N each include at least one data port comprising circuitry implementing the physical layer (PHYS) of a network connection to respective switches 302-1 . . . 302-N. (For clarity, the data port(s) of each network switch 302-1 . . . 302-N are not shown in FIG. 3). Network switches 302-1 . . . 302-N may be connected to a computer network 308, or another network component, via respective network connections 310-1 . . . 310-N (where N≥1). In operation, network switches 302-1 . . . 302-N may function to route network data transfers between computer network 308 and other network components, such as one or more port extension modules 304-1 . . . 304-N (where N≥1) in the example of FIG. 3, through respective data ports in each network switch 302-1 . . . 302-N.

Network switches 302-1 . . . 302-N may further include logic (not shown in FIG. 3 for the sake of clarity) for controlling their operation. Such logic may be implemented in various forms, such as with application-specific integrated circuits (ASICs), microprocessors, microcontrollers, or combinations thereof.

Port extension modules 304-1 . . . 304-N may include at least one data port (not shown in FIG. 3), representing the circuitry implementing the physical layer (PHYS) of a network connection to respective port extension modules 304-1 . . . 304-N. Port extension modules 304-1 . . . 304-N may be connected to one or more additional network devices 316 via one or more respective network connections 318-1 . . . 318-N (where N≥1). Port extension modules 304-1 . . . 304-N may further include logic for controlling operation thereof. Such logic may be implemented in various forms, such as with application-specific integrated circuits (ASICs), microprocessors, microcontrollers, or combinations thereof.

As shown in FIG. 3, network switches 302-1 . . . 302-N are connected to respective port extension modules 304-1 . . . 304-N by one or more network connections 322-1 . . . 322-N (where N≥1). It is to be understood that each network connection 322-1 . . . 322-N in FIG. 3 may comprise one or more individual network cables (not shown separately in FIG. 3), with each such network cable supporting data transfer up to a maximum bandwidth. In the example of FIG. 3, connections 322-1 . . . 322-N may be of various lengths and of various basic types, such as copper, optical fiber, etc., and may have various bandwidth capacities. Further, network cables 322-1 . . . 322-N may incorporate cable identifier mechanisms providing information about physical characteristics, bandwidth capacities and/or other capabilities. Moreover, as noted above, the identifier interfaces enable other connected devices to discern the network topology of the network in which the cables are deployed. Such cable identifier mechanisms may include embedded tags or other logic encoding identifying information accessible to connected circuitry, such as, for example, logic in network switches 302-1 . . . 302-N and logic in port extension modules 304-1 . . . 304-N.

With continued reference to FIG. 3, network system 300 further includes a management resource 324, coupled to network switches 302-1 . . . 302-N by connections 326-1 . . . 326-N (where N≥1), and coupled to port extension modules 304-1 . . . 304-N by connections 328-1 . . . 328-N (where N≥1). In this example, connections 326-1 . . . 326-N and 328-1 . . . 328-N allow management resource 324 to communicate with network switches 302-1 . . . 302-N and port extension modules 304-1 . . . 304-N. In some examples, connections 326-1 . . . 326-N and 328-1 . . . 328-N may be bi-directional serial data connections, such as connections based on the Controller Area Network (CAN) bus standard.

In one example, management resource 324 may be connected to computer network 308 via a connection 330, such that management resource 324 may thereby communicate with other devices or systems connected to computer network 308. For example, as shown in FIG. 3, management resource 324 may communicate via connection 330 and computer network 308 with a network configuration server 334 connected to computer network 308 by a network connection 336. Further, management resource 324 may be connected to one or more network devices 316 via a connection 332, such that management resource 324 may communicate with or otherwise obtain information about network devices 316.

In the example network system 300 of FIG. 3, a first network switch, such as network switch 302-1 may be configured to operate cooperatively with another network switch, such as 302-N. Such cooperative configuration may be one of redundancy, where for example network switch 302-1 is configured to operate in parallel with network switch 302-N, such that in the event that either network switch 302-1 or 302-N were to unexpectedly fail or were otherwise disabled, the redundant counterpart network switch would continue to operate and maintain overall network operation at either partial or full bandwidth. A cooperative configuration between two network switches, such as 302-1 and 302-N, may also be established wherein the two network switches cooperate in tandem to function as a single "virtual" network switch having the combined capacity of the two cooperating network switches.

A cooperative configuration of two or more network components such as network switches may be specified by a network configuration server, such as network configuration server 334. In such cases, a common desired configuration may be specified for the two cooperatively-configured switches. In the event that a configuration change occurs at one cooperatively-configured network component, it may be desirable to ensure that the configuration of the other cooperatively-configured component is adjusted accordingly.

For example, in a cooperative configuration of two or more network components such as network switches, issues such load imbalancing may arise. Overall network performance may be degraded in the event that one cooperating component is configured differently than another. In recognition of this, during operation of a network system, such as network system 300 in FIG. 3, management resource 324 may be responsive to changes in the connection configuration of a first cooperating switch, such as network switch 301-1, relative to the connection configuration of the second cooperating switch, such as network switch 302-N. In one example, management resource 324 may operate to dynamically configure cooperatively-configured network components to reduce or eliminate mismatch between their respective configurations. Thus, for example, if a connecting cable to cooperatively-configured network switch 302-1 fails or is disconnected, resulting in a decrease in the total maximum bandwidth for network switch 302-1, management resource 324 may operate to change the configuration of the other cooperative-configured network switch 302-N in order to prevent a mis-match between the data transfer performance between the two network switches 302-1 and 302-N. Additionally, if a connecting cable to a cooperatively-configured network switch 302-1 fails or is disconnected, management resource 324 may operate to fully disable the cooperatively-configured network switch 302-1 to prevent a condition in which active data flows are lost by reestablishing active data flows through the surviving cooperatively-configured switch 302-N.

Figure 4:
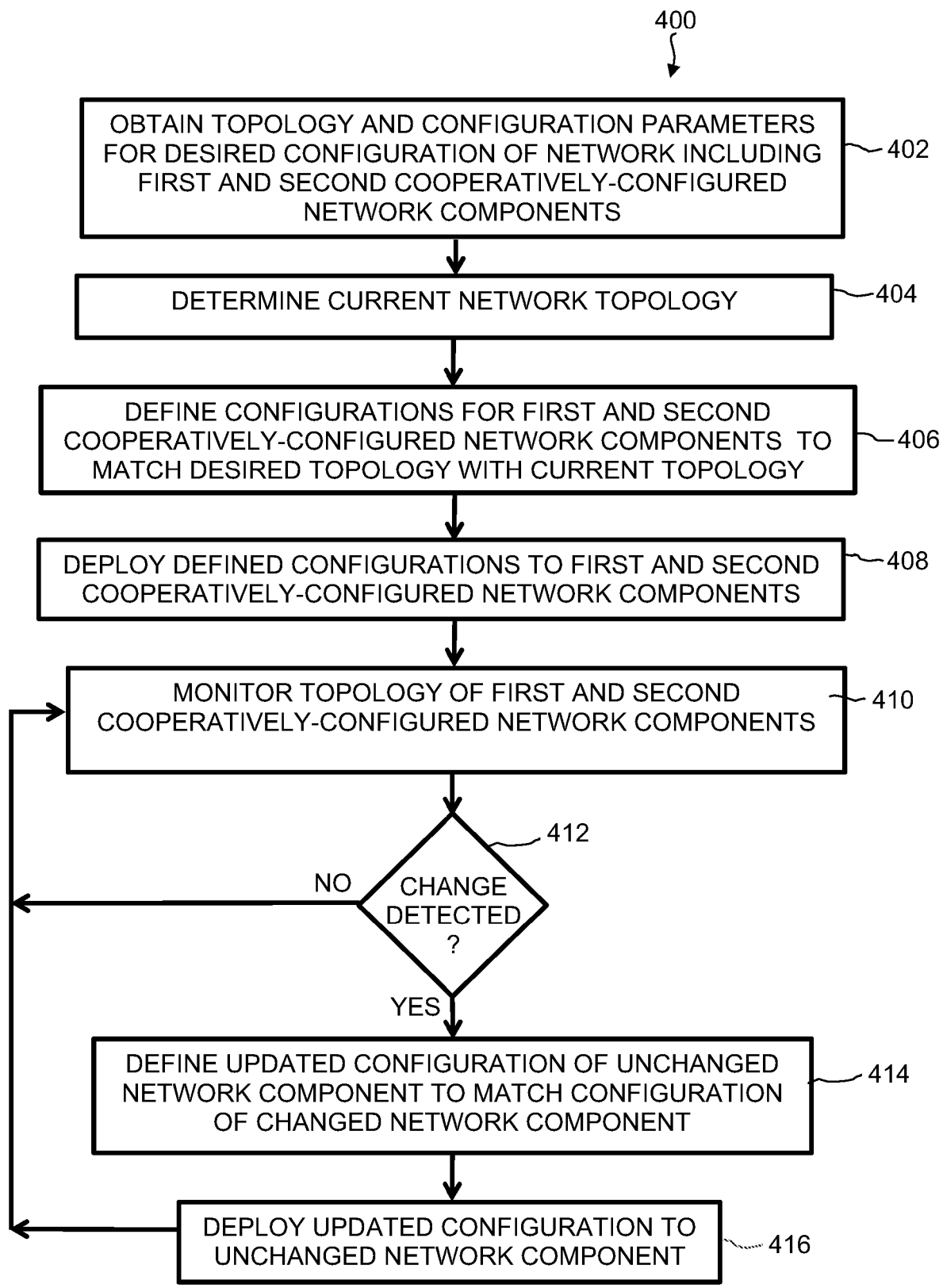
FIG. 4 is a block diagram of an example method for configuring a network connection.

FIG. 4 is a flow diagram illustrating a method 400 for operating of a management resource, such as management resources 324 in the example network system 300 of FIG. 3, where two network components coupled to the management resource are cooperatively configured, such as in an implementation of a virtual switch or in providing redundancy.

In method 400, at a first block 402, a management resource obtains parameters specifying a desired configuration of two cooperatively-configured network components, such as two network switches. The desired configuration parameters may be obtained, for example, from a network configuration server accessible to the management resource, such as by management resource 324 in the example of FIG. 3 obtaining desired configuration information from network configuration server 334.

In block 404, a management resource may determine the current connection configurations of two network components. This determination may be accomplished through interrogation of the respective network components as well as the connection cables connecting the two network components.

In block 406 of FIG. 4, a management resource may define configurations for two network components, with the objective of matching a desired configuration of the components with the actual connection configuration of the network components as determined in block 404. The desired configuration of the components may be specified by a network configuration server, such as network configuration server 334 in the example of FIG. 3.

In some cases, a desired configuration may specify a connection bandwidth between the two network components that cannot be accommodated by the actual connection configuration for the components as determined in block 404. In such cases, the management resource may specify a configuration of the network components which utilizes all available bandwidth provided by the connecting cables. In other cases, a desired configuration for two network components may specify a connection bandwidth less than the bandwidth provided by the actual connection configuration determined in block 404. In such cases, the management resource may define a configuration for the network components which utilizes less than the total maximum bandwidth provided by the connection cables. In still other cases, a desired network configuration may specify that management resource 324 should configure the network devices to utilize all available bandwidth provided by the actual connection configuration. In another case, the management resource 324 may prevent communication when the desired connection bandwidth exceeds the bandwidth that can be accommodated by the connection configuration for the components determined in block 404.

In one example, the desired network configuration obtained in block 402 may specify that the configuration of two network components should be correlated to the network configuration of two other network components. For example, a first network switch and port extension module, comprising one network component pair, may be cooperatively configured with another network switch and port extension module, comprising a second network component pair. As noted, such cooperative configuration may be a redundant configuration, for example, in which the first network component pair is configured to operate redundantly with the second network component pair, such that in the event that one of the network pairs was to fail, the redundant network component pair may continue operation to ensure continuous operation of the overall network, at either full or reduced capacity. Another cooperative configuration may be a virtualizing configuration, in which one network component pair is configured to operate with another network component pair as a single "virtual" network component.

Thus, in block 406, as configurations for two network components are being defined, a management resource may consider not only the connection configuration of the two network components, but also the actual connection configuration of one or more other network components.

Once configurations for the two network components are defined in block 406, the network configurations may be deployed to the network components. The deployment of the configurations may involve, for example, a management resource issuing control signals to the connected network devices causing the network devices to adjust their operation according to the defined configuration.

Once network components have been deployed in block 408, in block 410 a management resource may operate to periodically or continuously monitor the connection configuration between the components, as represented by block 410 in FIG. 4.

As represented by decision block 412, so long as no change in a connection configuration is detected, the management resource may return to block 410 for monitoring of the connection configuration. On the other hand, if a connection configuration is detected in block 412, a management resource may determine that due to a cooperative configuration arrangement, and may define an updated configuration for the cooperatively-configured network component(s), as represented by block 414 in FIG. 4. This updated definition may be established to ensure a match between the configurations of the cooperatively-configured components. Thus, in block 416, the updated configuration may be deployed to the unchanged network component(s) to implement the configuration change. Thereafter, the management resource may return to block 410 for continued monitoring of connection configurations of the network components.

Figure 5:
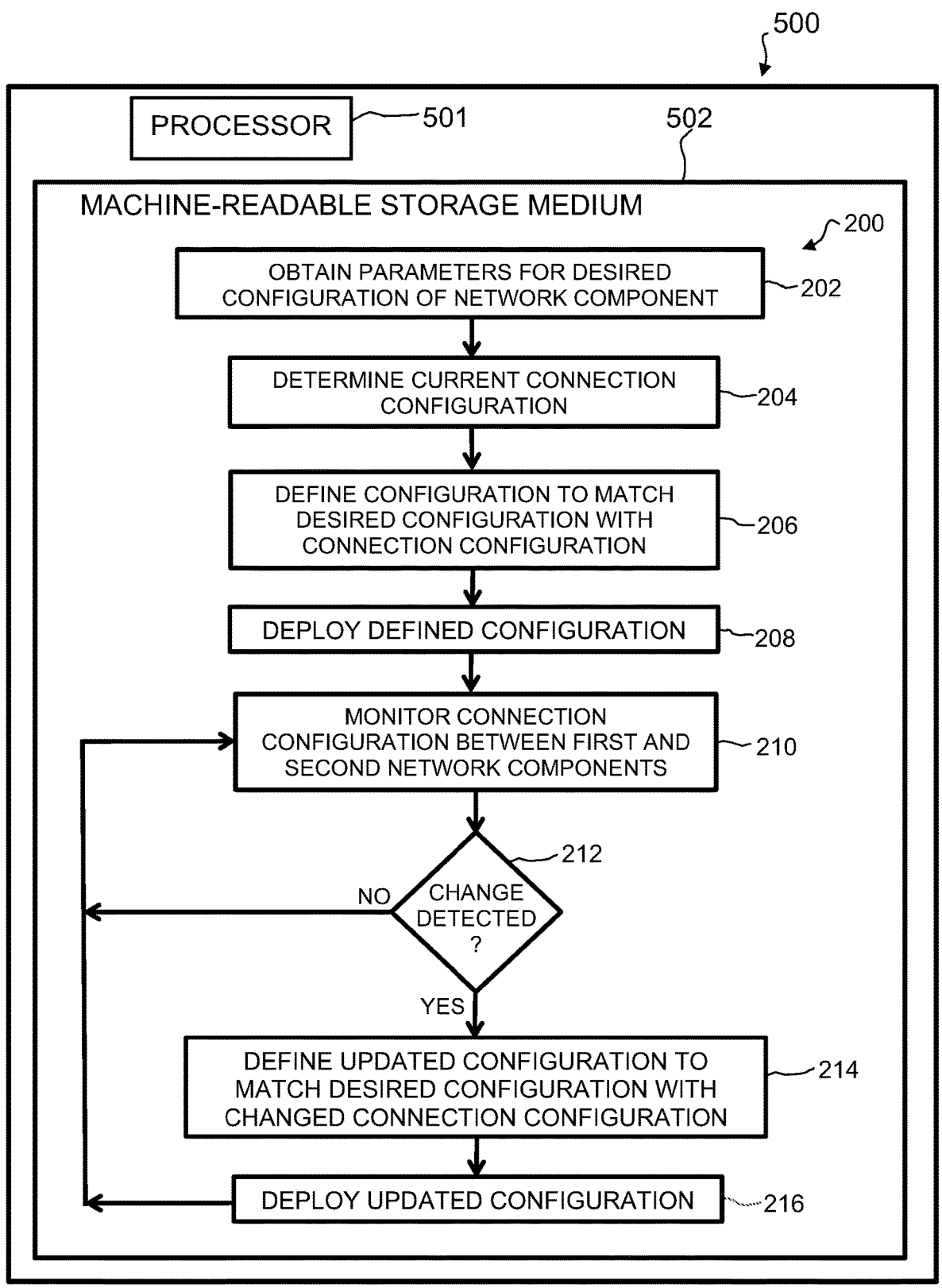
FIG. 5 is a block diagram of an example implementation of a network management resource in accordance with one or more examples of the present disclosure.

FIG. 5 is a block diagram of a computing resource 500 implementing a method of configuration according to one or more disclosed examples. Computing device 500 includes at least one hardware processor 501 and a machine readable storage medium 502. As illustrated, machine readable medium 502 may store instructions, that when executed by hardware processor 501 (either directly or via emulation/virtualization), cause hardware processor 501 to perform one or more disclosed methods relating to establishing and operating a scalable persistent memory region in the system memory of a computing resource. In this example, the instructions stored reflect a methodology as described with reference to method 200 in FIG. 2.

Figure 6:
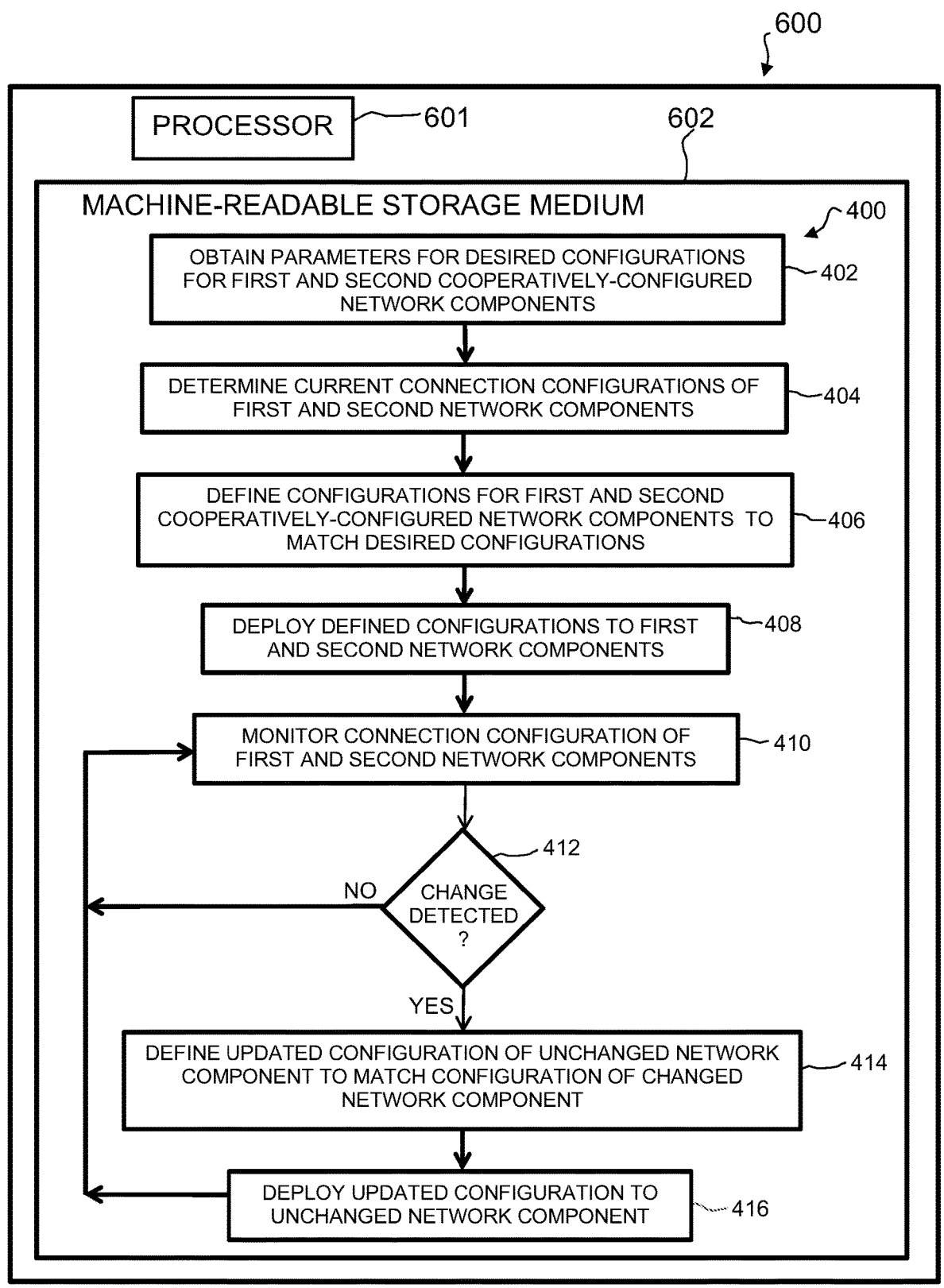
FIG. 6 is a block diagram of another example implementation of a network management resource in accordance with one or more examples of the present disclosure.

FIG. 6 is a block diagram of a computing resource 600 implementing a method of configuration according to one or more disclosed examples. Computing device 600 includes at least one hardware processor 601 and a machine readable storage medium 602. As illustrated, machine readable medium 602 may store instructions, that when executed by hardware processor 601 (either directly or via emulation/virtualization), cause hardware processor 601 to perform one or more disclosed methods relating to establishing and operating a scalable persistent memory region in the system memory of a computing resource. In this example, the instructions stored reflect a methodology as described with reference to method 400 in FIG. 4.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A network system, comprising:
a first network component having a first plurality of data ports;
a second network component having a second plurality of data ports;
a plurality of connecting cables, each connecting cable coupled between one of the first plurality of data ports and one of the second plurality of data ports, each connecting cable to provide data transfer at up to a maximum bandwidth between the first network component and the second network component,
wherein a respective connecting cable of the first and second plurality of connecting cables includes a cable identifier interface which provides, to the management resource, embedded tags or logic encoding identifying information accessible to connected circuitry at each end of the respective connecting cable, wherein the connected circuitry comprises data port logic modules in the first and second network components; and
a management resource coupled to the first network component and the second network component, the management resource to determine a total maximum bandwidth provided by the plurality of connecting cables, and to configure the first plurality of data ports and the second plurality of data ports to operate to provide data transfer between the first network component and the second network component at a first total operating bandwidth less than or equal to the total maximum bandwidth provided by the plurality of connecting cables.

2. The network system of claim 1, wherein the first network component comprises a network switch and the second network component comprises a port extension module.

3. The network system of claim 1, wherein the management resource is dynamically responsive to a change in the total maximum bandwidth corresponding to a change in the plurality of connecting cables to reconfigure the first plurality of data ports and the second plurality of data ports to provide data transfer between the first network component and the second network component at a second total operating bandwidth less than or equal to the changed total maximum bandwidth.

4. The network system of claim 1, wherein the respective connecting cable includes a terminal which comprises the cable identifier interface, wherein the cable identifier interface further provides, to the management resource, physical characteristics and bandwidth capacities associated with the respective connecting cable.

5. The network system of claim 1, wherein the management resource is coupled to the first network component and the second network component by respective serial communications channels.

6. A network system, comprising:
a first network component having a first plurality of data ports;
a second network component having a second plurality of data ports;
a first plurality of connecting cables each coupled between the first plurality of data ports and the second plurality of data ports, each of the first plurality of connecting cables to provide data transfer at up to a first total maximum bandwidth between the first network component and the second network component;
a third network component having a third plurality of data ports;
a fourth network component having a fourth plurality of data ports;
a second plurality of connecting cables each coupled between the third plurality of data ports and the fourth plurality of data ports, each of the second plurality of connecting cables to provide data transfer at up to a second total maximum bandwidth between the third and fourth network components,
wherein a respective connecting cable includes a cable identifier interface which provides, to the management resource, embedded tags or logic encoding identifying information accessible to the first, second, third, or fourth network component at each end of the respective connecting cable;
a management resource coupled to at least one of the first network component and the second network component and to at least one of the third network component and the fourth network component, the management resource to determine the first total maximum bandwidth and the second total maximum bandwidth, and to configure the first, second, third, and fourth plurality of data ports to operate at respective first and second operating bandwidths to provide, between the first and second network components and between the third and fourth network components, one of (i) a predetermined target bandwidth less than the first total maximum bandwidth and less than the second total maximum bandwidth, (ii) the first total maximum bandwidth, or (iii) the second total maximum bandwidth.

7. The network system of claim 6, wherein the first network component and the second network component define a first network switching environment and the second network component and the third network component define a second network switching environment operable cooperatively with the first network switching environment.

8. The network system of claim 7, wherein the first network component and the third network component are configured to operate cooperatively.

9. The network system of claim 8, wherein the first network component and the third network component are configured to operate redundantly.

10. The network system of claim 8, wherein the first network component and the third network component are configured to operate as a virtualized pair.

11. The network system of claim 6, wherein the management resource is dynamically responsive to a change in either the combined first and second total maximum bandwidths corresponding to a change in the first and second plurality of connecting cables to reconfigure the first network component and the second network component to operate at the least of: (i) the predetermined target bandwidth, (ii) the first total maximum bandwidth after the change, and (iii) the second total maximum bandwidth after the change.

12. The network system of claim 6, wherein the cable identifier interface further provides encoded information to the management resource, the encoded information providing unique identifiers for the respective connecting cable.

13. A method for configuring a network switching environment, comprising:
communicatively coupling a management resource to a first switch and to a first port extension module, the first switch having a first plurality of data ports coupled to a second plurality of data ports of the first port extension module, by a first plurality of connecting cables each providing data transfer at up to a first maximum bandwidth between the first switch and the first port extension module;
communicatively coupling the management resource to a second switch and to a second port extension module, the second switch having a third plurality of data ports coupled to a fourth plurality of data ports of the second port extension module by a second plurality of connecting cables each providing data transfer at up to a second maximum bandwidth between the second switch and the second port extension module,
wherein a respective connecting cable includes a cable identifier interface which provides, to the management resource, embedded tags or logic encoding identifying information accessible to the first or second switch or the first or second port extension module at each end of the respective connecting cable;
detecting, in the management resource, the first maximum bandwidth and the second maximum bandwidth; and
configuring the first, second, third, and fourth plurality of data ports to operate at the least of (i) a predetermined target bandwidth, (ii) the first maximum bandwidth, and (iii) the second maximum bandwidth.

14. The method of claim 13, further comprising:
detecting a change in at least one of the first and second maximum bandwidths; and
upon detecting a change in at least one of the first and second maximum bandwidths, reconfiguring the first, second, third, and fourth plurality of data ports to operate a bandwidth that is the least of (i) the predetermined target bandwidth, (ii) the first maximum bandwidth after detecting a change, and (iii) the second maximum bandwidth after detecting a change.

15. The method of claim 13, wherein detecting, in the management resource, the first and second maximum bandwidths comprises obtaining encoded information from the first and second plurality of connecting cables, the encoded information including a unique identifier of each of the first and second plurality of connecting cables.

16. A non-transitory computer-readable medium tangibly embodying instructions executable by a hardware processor to:
   detect, in a management resource communicatively coupled to a first switch having a first plurality of data ports and to a first port extension module having a second plurality of data ports, each of the first plurality of data ports being coupled to one of the second plurality of data ports by one of a first plurality of connecting cables providing data transfer at up to a first total maximum bandwidth;
   detect, in the management resource further communicatively coupled to a second switch having a third plurality of data ports and to a second port extension module having a fourth plurality of data ports, each of the third plurality of data ports being coupled to one of the fourth plurality of data ports by one of a second plurality of connecting cables providing data transfer at up to a second total maximum bandwidth,
   wherein a respective connecting cable includes a cable identifier interface which provides, to the management resource, embedded tags or logic encoding identifying information accessible to the first or second switch or the first or second port extension module at each end of the respective connecting cable; and
   configure the first, second, third, and fourth plurality of data ports to operate at one of (i) a predetermined target bandwidth less than the first total maximum bandwidth and less than the second total maximum bandwidth, (ii) the first total maximum bandwidth, and (iii) the second total maximum bandwidth.

17. The non-transitory computer-readable medium of claim 16, wherein the step of detecting, in the management resource, the first and second total maximum bandwidths comprises obtaining encoded bandwidth information from the first and second plurality of connecting cables.

18. The non-transitory computer-readable medium of claim 16, wherein the first switch and the first port extension module are cooperatively configured with the second switch and the second port extension module.

19. The non-transitory computer-readable medium of claim 18, wherein the first switch and the first port extension module are configured to operate redundantly with the second switch and the second port extension module.

20. The non-transitory computer-readable medium of claim 18, wherein the first switch and the first port extension module are configured to operate with the second switch and the second port extension module as a single virtualized switch and port extension module.

* * * * *